Jan. 7, 1969

G. G. HIRS 3,420,583

BEARING FOR RADIAL AND AXIAL LOADS

Filed May 17, 1966

INVENTOR.
GILLES GERARDUS HIRS
BY
ATTORNEYS

United States Patent Office 3,420,583
Patented Jan. 7, 1969

3,420,583
BEARING FOR RADIAL AND AXIAL LOADS
Gilles Gerardus Hirs, Reeuwijk, Netherlands, assignor to Nederlandse Organisatie voor Toegepast-Natuurwetenschappelijk Onderzock ten behoeve van Nijverheid, Handel en Verkeer, The Hague, Netherlands, a corporation of the Netherlands
Filed May 17, 1966, Ser. No. 550,741
Claims priority, application Netherlands, May 21, 1965, 6506475
U.S. Cl. 308—9        2 Claims
Int. Cl. F16c 35/00

ABSTRACT OF THE DISCLOSURE

A bearing for transmitting radial and axial loads between two elements which are rotatable with respect to each other and each of which possesses a bearing surface having a mainly cylindrical part and an adjoining mainly flat radial part, the said elements, when operated normally, being separated by a slit-shaped space which is filled with a medium that transmits the load. In dependency on the application of the bearing, the medium can be either a liquid or a gas.

---

Figure 1:
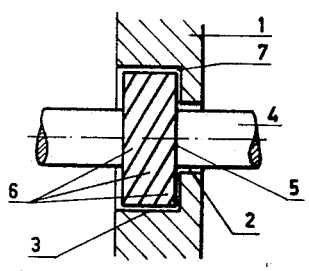

These commonly used bearings give rise to a number of problems. It is difficult to realize a proper hydro-or aerodynamic lubrication for the flat part receiving the axial load, unless expensive measures are taken. At the same time, the stability of the known bearings is insufficient for many applications, especially at high speeds of revolution. The stability of the bearing is here understood to mean the stability of the equilibrium between the pressure distribution in the medium and the exterior forces on the bearing. One may distinguish between the stability of the cylindrical part and that of the flat part of the bearing, which often have to meet different requirements.

It is the object of this invention to provide an improvement on the existing bearings in this respect.

For this purpose, the bearing according to the invention is characterized in that the slit-shaped space comprises at least two regions, one of the two bearing surfaces positioned opposite each other in the first region being provided with a number of grooves, which are placed in such a direction obliquely with respect to the direction of motion that, at the direction of rotation, for which the bearing is meant, they will cause a stemming of the medium in the direction of the adjoining second region, and the slit-shaped space having approximately the same width in and near the border of the two regions.

In the second region both the bearing surfaces may be smooth, or one of the bearing surfaces may be provided with oblique grooves, which, at the normal direction of rotation of the bearing, will cause a stemming of the medium in the direction of the first region.

From the point of view of manufacturing technique it may seem attractive to have the border between the two regions coincide with the border between the cylindrical part of the bearing and the flat part of the bearing. On the other hand, however, this gives rise to the problem of constructing the border between these two parts of the bearing in such a way that the rounded corner of one part or the turned groove in the part opposite shall not give rise to the formation of an annular channel at this location. It is true that such a channel has no unfavourable influence on the axial load carrying capacity, because the stemming of the medium and the stabilizing activity thereof on parallel axial displacements remain maintained, but it causes a short-circuit at the end of the grooves so that the annular channel would otherwise bring about the complete loss of the stability of the bearing.

Also, if an annular channel should be present in one of the two regions, this would unfavourably influence the stability, but not to the same degree. Generally speaking, in such a case the stability of the bearing is determined by that part of the bearing that comprises the region without the channel and the other region as far as to the channel.

It is possible to construct the bearing with more than two regions, for instance with three regions, the bearing surfaces in the middle region being smooth, and the other two each having a bearing surface which is grooved in such a way as to cause a stemming of the medium towards the middle region. If in such a bearing an annular channel is present between two regions, the stability of the bearing is determined by the two regions which are not separated by this channel.

It is to be observed that the profile of the grooves is not very critical. Preferably, a depth is chosen for the grooves not larger than a few times the average width of the slit, whilst the length of the grooves should be at least a few times as large as the pitch of the grooves.

The invention will be further explained hereinafter with reference to the accompanying drawing, in which are shown cross-sections of a number of embodiments of bearings according to this invention.

In the embodiment according to FIG. 1 the bore 2 and the larger bore 3 are provided in the bearing-case 1. The thickened part 5 of the shaft 4 is positioned coaxially in the bores 2 and 3, there being an ample clearance between the shaft 4 and the bore 2 and a narrow slit being present between the part 5 of the shaft 4 and the bore 3.

The side surface of the thickened part 5 which is directed toward the bore 2, and the surface of the bearing-case 1 situated opposite it, are flat surfaces perpendicular to the centre line of the shaft 4 and they constitute the bearing part for the reception of the axial loads. The outer surface of the part 5 is provided with grooves 6 and together with the bore 3 it forms the bearing part that receives the radial loads.

The part 5 and the bore 3 in the case 1 are made in such a way that the slit-shaped space between these two is not larger at 7 than it is elsewhere.

When a medium is present in the space between the shaft 4 and the bearing case 1 as well as outside of it, the medium in the radial part of the bearing is stemmed to the right by the grooves 6 and there is built up a pressure, which is transmitted into the axial part of the bearing and can receive an axial load of the shaft 4. In dependency on the magnitude of the load, the slit between these flat surfaces will be larger or smaller and the pressure of the medium will assume a corresponding smaller or larger value.

An excentric position of the shaft 4 in the bore 3 will locally cause a narrowing of the slit between the shaft part 5 and the bore 3, so that at that location there arises an increase of the pressure, which tends to neutralize the excentricity.

An oblique position of the shaft 4 in the bore 3 will locally cause a narrowing of the slit between the flat surfaces of the shaft part 5 and the bore 3 and at that location it will bring about an increase of the resistance of flow of the medium and in consequence thereof cause a higher pressure of the medium, which counteracts the oblique position of the shaft 4.

In case there should be present a circular channel in the slit-shaped space at 7, because, for instance, at that location, owing to inaccuracies in the technical finish, the form of the shaft should not entirely correspond with the form of the bore 3, the said channel would distribute the pressure of the medium evenly over the whole of the periphery of the slit of the bearing, so that, at deviating positions of the shaft 4 with respect to its position of equilibrium, no stabilizing forces would occur, except for parallel displacements in axial direction.

Figure 2:
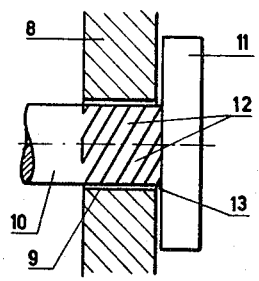

In FIG. 2 is shown a bearing, in which the shaft 10 with the flange 11 is provided in the bore 9 of the bearing-case 8. The shaft 10 is provided with helical grooves 12. Between the bore 9 and the shaft 10, as also between the flange 11 and the flat side surface of the bearing-case 8, there is a narrow slit, which is filled with a medium, which is also present outside of the slit.

The operation of this bearing corresponds entirely to that according to FIG. 1. The stemming effect of the grooves 12 provides the axial load carrying capacity of the bearing, whilst, when there is a precise conformity of the shaft 10 and the bearing-case 8 at the location 13, where the two parts of the bearing border on each other, the medium has a stabilizing pressure distribution in a radial and in an axial sense.

Figure 3:
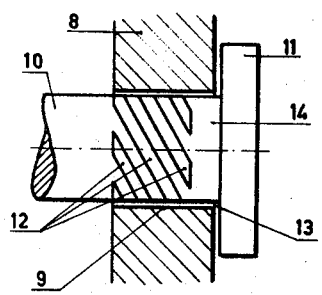

The bearing according to FIG. 3 has the same arrangement as the one according to FIG. 2, however with this difference that the grooved region of the shaft 10 extends only over a section of the radially carrying part of the bearing and that the remaining part of the shaft 10 is smooth.

If, when producing this bearing, care is taken that no widening of the slit occurs in the border 13 between the two parts of the bearing, the operation of this bearing is entirely comparable to that of the bearing according to FIG. 2. If, however, such a widening of the slit 13 is actually present, it is impossible that, between the flat surfaces of the flange 11 and the bearing case 8, which carry the thrust load, there should be formed any stabilizing pressure distribution in the medium as to an oblique positioning of the two surfaces relative to one another. However, an annular channel near 13 has no harmful influence of any importance on the stability of the radially carrying part of the bearing, because the high resistance of the narrow slit in the ungrooved region of this part of the bearing prevents the occurrence of short circuit of tangential pressure gradients.

In this type of bearing, there are no special requirements for the finish of the shaft 10 and the bearing-case 8 at the location 13, if the stability against obliqueness of the axial part of the bearing is abandoned. This renders the bearing attractive for those cases, in which the stability against the obliqueness of the shaft has already been secured in some other way, which is the case, for instance, when a shaft is supported in two places by bearings situated at a sufficient distance from one another.

Figure 4:
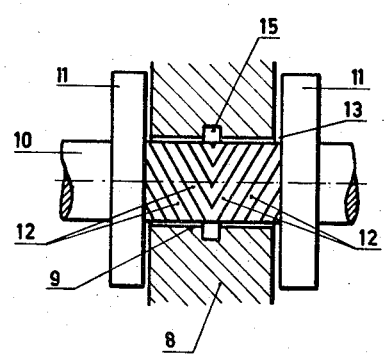

Lastly, FIG. 4 shows a bearing, which actually is a doubling of the bearing according to FIG. 2 and which is adapted to receive axial loads in two directions. In order to ensure the medium supply necessary for building up the pressure, there has been provided the annular channel 15, which is connected to a medium supply in a manner not indicated in the drawing.

In the examples of bearings described hereinbefore the surfaces in the parts of the bearing receiving the thrust loads are of smooth finish. It is, however, also possible, to provide these surfaces entirely or on one of their annular parts with grooves, which should run spirally in such a direction that, at the normal direction of rotation of the shaft, they will have a stemming effect in the direction of the cylindrical part of the bearing, which in this case may have smooth running surfaces, or again a grooved or a partly smooth and partly grooved running surface.

I claim:
1. A hydrodynamic bearing adapted to support radial and axial loads comprising a first cylindrical member having an enlarged position defining a plane flat surface projecting at right angles to said first member, a second member having an aperture and a plane flat surface projecting at right angles to said aperture, said aperture receiving said first member to form an annular interface and said surfaces of said first and second members forming a normal interface, a medium supplied to said annular interface between said first and second members, and helical distributing means disposed along said cylindrical member for distributing said medium from said annular member interface to said normal interface, the space located at the border of the annular and normal interfaces being not larger than a slit shaped space between the cylindrical member and said aperture whereby an oblique portion of the cylindrical member during operation in the aperture will locally cause a narrowing of the slit between the normal interface and will bring about an increase of resistance to flow of the medium and cause a higher pressure of the medium which counteracts the oblique position of the cylindrical member to center same.

2. A bearing according to claim 1 wherein said helical distributing means is a helical groove disposed along the longitudinal circumference of said cylindrical member to distribute said medium to said annular and normal interfaces.

References Cited

UNITED STATES PATENTS

| | | | |
|---|---|---|---|
| 3,027,471 | 3/1962 | Burgwin et al. | 308—9 |
| 3,048,043 | 8/1962 | Slater et al. | |
| 3,146,036 | 8/1964 | Bennatti | 308—9 |

FOREIGN PATENTS 1,011,413  12/1965  Great Britain.

MARTIN P. SCHWADRON, *Primary Examiner.*

FRANK SUSKO, *Assistant Examiner.*